Figure 1:
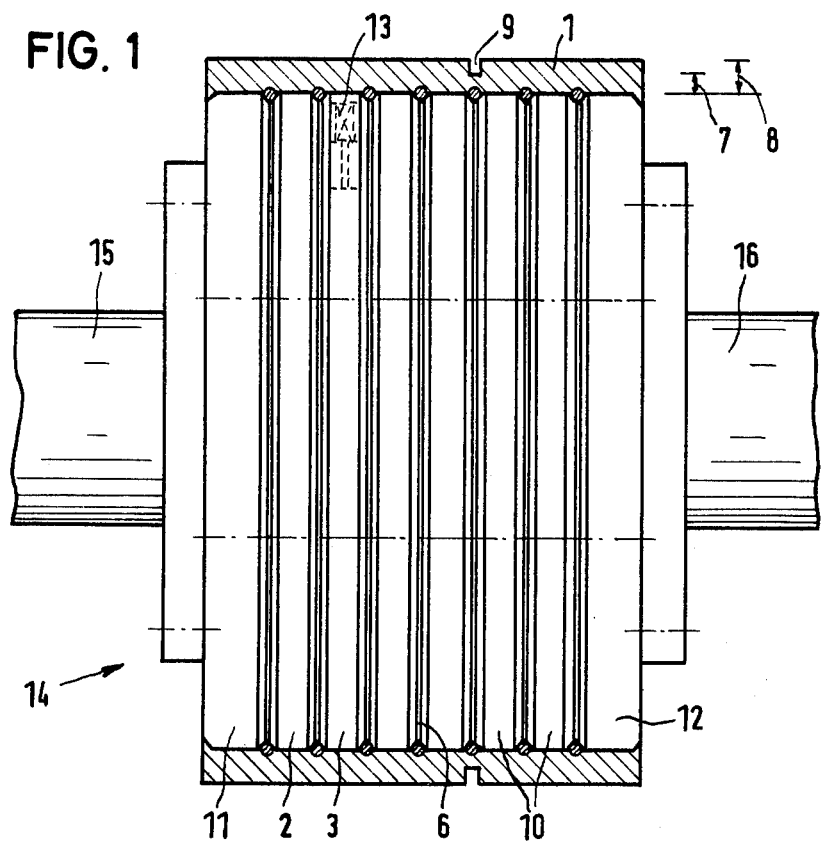

United States Patent [19]

Berger et al.

[11] 4,300,403
[45] Nov. 17, 1981

[54] APPARATUS FOR MEASURING STRESS DISTRIBUTION ACROSS THE WIDTH OF FLEXIBLE STRIP

[75] Inventors: Bernd Berger, Kaarst; Gert Mücke, Hilden; Helmut Thies, Kaarst; Eberhard Neuschütz, Ratingen; Heinz Oppermann, Düsseldorf, all of Fed. Rep. of Germany

[73] Assignee: Betriebsforschungs Institut VDeh, Düsseldorf, Fed. Rep. of Germany

[21] Appl. No.: 158,926

[22] Filed: Jun. 12, 1980

[30] Foreign Application Priority Data

Jun. 15, 1979 [DE] Fed. Rep. of Germany ....... 2924315

[51] Int. Cl.³ .............................................. G01L 5/10
[52] U.S. Cl. ................................................. 73/862.07
[58] Field of Search .............................. 73/159, 862.07

[56] References Cited

U.S. PATENT DOCUMENTS

| | | | |
|---|---|---|---|
| 3,481,194 | 12/1969 | Sivilotti et al. | 73/862.07 |
| 3,557,614 | 1/1971 | Muhlberg | 73/862.07 |
| 3,902,362 | 9/1975 | Ishimoto | 73/862.07 |

Primary Examiner—S. Clement Swisher
Attorney, Agent, or Firm—Holman & Stern

[57] ABSTRACT

Apparatus for measuring stress distribution across the width of a flexible strip travelling in the direction of its length, comprising a pick-up deflector roller having a plurality of rings, encased in a tire of flexible material, the edges of the rings being cut away to produce local stress in the tire as compared with a smooth cylindrical roller.

11 Claims, 3 Drawing Figures

APPARATUS FOR MEASURING STRESS DISTRIBUTION ACROSS THE WIDTH OF FLEXIBLE STRIP

This invention relates to apparatus of the kind used for measuring stress distribution across the width of a flexible strip travelling in the direction of its length particularly in the cold rolling of steel strip.

Apparatus of this kind is basically known and described, for example, in "Stahl and Eisen", 1975, pages 1051 to 1056. It is designed for measuring elongation distribution in strip material, which is expressed in the form of stress in longitudinally advancing strip and in this way accessible to measuring techniques. For improved wear resistance conventional deflector rollers of this kind are provided with a common outer cover or tyre of a wear resistant material, e.g. steel or the like, which is shrunk on the roller. However, this has the disadvantage that by this method contraction or shrinkage stresses are introduced into the sensor elements which stresses represent falsifying variables and detract from the accuracy of the measured data. Another drawback resides in that the sensitivity to cross-interference, ie. the influence of one sensor point on adjacent sensor points becomes less favourable. In other words, a fraction of the measured force is diverted by the outer cover to neighbouring sensors. Lastly, in operation the tyre is liable to slip axially on the roller and thus give rise to malfunction of the measuring device itself and even complete operational breakdown.

Seen against this background, it is the aim of the present invention to develop apparatus of the kind specified further in the direction of making it largely insensitive to data falsification by cross-interference of sensor signals. It is also the aim of the invention to ensure that in operation the tyre cannot slip relative to the roller whilst at the same time the sensors must not be subjected to the influence of shrinkage strains or the like.

According to this invention there is provided apparatus for measuring stress distribution across the width of flexible strip travelling in the direction of its length, of the kind comprising a pick-up deflector roller comprising a plurality of closely laterally adjacent rings running with the strip, the strip being angularly deflected under tension said rings bring encased in a common outer cover or tyre comprising a flexible elastic synthetic or natural material, and the peripheral edges of adjoining rings are cut away and the resulting local recesses, as compared with a smooth cylindrical roller surface, are at least partially filled by the material of the outer tyre.

In this way it is possible to provide a pick-up deflector roller wherein the outer cover not only provides protection against wear but is also secured on the roller in a virtually stress free manner. The latter result is due to the fact that the local recesses which are created by the chamfered ring edges provide an anchorage for the tyre, the material of the latter partially filling these recesses so that the very considerable strains arising from a conventional shrink-fit need no longer be accepted.

However, the particular advantage of the arrangement resides in that the tyre permits a virtually un-falsified reading to be obtained at each sensor point without superimposed cross induced interference signals. This effect can be still further improved by the provision of peripheral cuts or incisions as specified in subclaim 4. Basically however, this result is due to the essential advantage that in a roller which is provided with an outer cover or tyre of this kind deformation is easier in the region of the joint or gap between adjacent rings than in the actual ring region because in said joint or gap region there is more of the flexible synthetic, or corresponding natural tyre material than in the actual ring region.

For example, the synthetic material may be polyurethane silicon or teflon, whilst rubber would be primarily considered as a suitable natural material. Penetration of synthetic material between adjacent rings beyond the marginal cut-outs can be prevented by fitting O-rings, also of synthetic material in said cut-outs. Preferably the marginal cuts take the form of continuous peripheral chamfers so that uniform geometrical relations are established over the entire circumference.

Where anchorage against axial movement is of critical importance this can be insured by vertical cuts or by suitably steep chamfer angles.

In such pick-up deflector roller the outer cover or tyre may have a fairly substantial wall thickness ranging from 5 to 200 mm. Such tyres can be produced either by moulding the outer cover material around the roller, or by winding foils around the latter, or by layerwise application and polymerisation, or vulcanisation, of the cover material around the roller. Fibre-reinforcements can be easily applied by conventional methods in as much as fibre mats, e.g. glass fibre mats, can be readily coiled around the roller jointly with the application of the synthetic cover material.

It is advisable, both with a view to achieving secure anchorage and additional wear resistance, to trim not only the mutually adjacent ring edges but also the outer edges of the outermost rings at the roller ends. The outer cover, or tyre on the otherhand, has a continuous cylindrical exterior surface which could at most provided with locally limited incisions as described.

Figure 2:
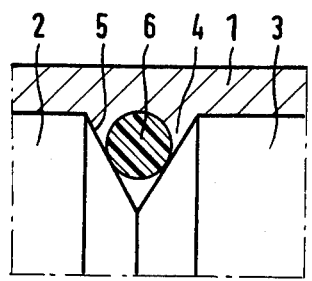
Figure 3:
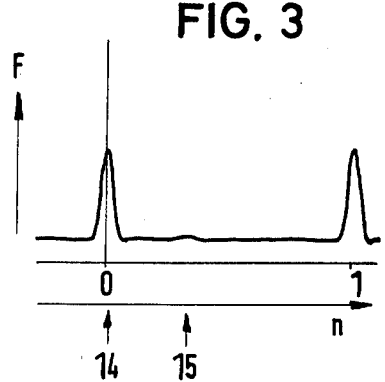

The invention will now be more specifically described with reference to the schematic drawings wherein:

FIG. 1 is a cross section through the new pick-up deflector roller constructed in accordance with the invention, FIG. 2 is an enlarged detail view of the region of mutually adjacent ring edges, and FIG. 3 is a graph recorded during roller revolution.

The pick-up deflector roller, generally indicated 14 in FIG. 1, comprises a plurality of discreet rings, some of which are indicated at 2, 3, 10, 11 and 12. These rings are clamped together to make up the roller 14 with journal pins 15, 16 at the ends. The latter are only partly indicated in the drawing. The force which is applied to the outer periphery of the rings can be measured by means of dynamometric sensors, one of which is shown in dotted lines at 13.

The most important region is the boundary region at the outer edges between two adjacent rings 2, 3. This vital boundary region is shown on a larger scale in FIG. 2. The drawing clearly reveals the two rings 2, 3 whereof the mutually adjoining outside edges are cut away, or broken, by chamfers 5. The chamfer angle is highly significant in as much as the more closely it approaches a right angle relative to the cylindrical wall of the outer cover, the greater will be the resulting anchorage effect. An O-ring 6 which may also consist of a synthetic material, is inserted in the recess 4 which is formed by the chamfered ring edges. This O-ring thus engages with the chamfered faces and is capable of providing a seal in the sense of preventing outer cover material from penetrating behind the O-ring between the directly abutting end faces of adjacent rings 2, 3. However, the material of the outer cover 1 penetrates into the recess on both sides of the O-ring and can at least be relied upon to combine superficially with the O-ring to ensure the desired anchorage effect. FIG. 2 also shows that any load applied in the area of the rings 2, 3 entails less deformation of the outer cover 1 that that which would result if the load were applied to the boundary or gap region between adjacent rings 2, 3. This effect can be further enhanced by using hollow tubular O-rings which also provide a better seal.

The new pick-up roller has a very high degree of insensitivity in respect of cross-interference or falsification of pick-up data arising from adjacent sensors 13, such mutual interference of adjacent sensors being of the order of less than 2 to 5%. This is shown in FIG. 3. In this figure, roller revolution 1, corresponding to a rotation angle of 360°, is plotted on the x-axis whilst the measured force F, which may be 900 N, is shown on the y-axis. Maximum force amplitude appears at revolution 0 which is represented by reference 14. A full revolution is required to repeat this amplitude reading as will be seen from the recorded graph of the x-axis data 1. At approximately one third revolution, the force curve F, at point 15, shows a just barely perceptible deflection which is caused by the sensor on the adjacent ring which is angularly offset relative to the first sensor through an angle of approximately 120°. In other words, the normal amplitude reading and this interfering signal are so widely spaced apart that falsification of test data by cross-interference of adjacent sensors is practically negligible. For these reasons the sensors in the new pick-up roller need not be individually circuited but, with special advantage may be branched in parallel or also in series, without any risk of cross-interference signals significantly affecting the test readings.

What is claimed is:

1. Apparatus for measuring stress distribution across the width of flexible strip travelling in the direction of its length, of the kind comprising a pick-up deflector roller comprising a plurality of closely laterally adjacent rings running with the strip, the strip being angularly deflected under tension, said rings being encased in a common outer cover or tyre comprising a flexible elastic synthetic or natural material, and the peripheral edges of adjoining rings are cut away and the resulting local recesses, as compared with a smooth cylindrical roller surface, are at least partially filled by the material of the outer tire.

2. Apparatus according to claim 1, wherein the edges of the rings are chamfered.

3. Apparatus according to claim 1, wherein O-rings of synthetic material are inserted into the edge regions of relatively adjacent rings, which are chamfered.

4. Apparatus according to claim 1, in which, in the region of the edges of adjacent rings, the tyre is provided with external incisions which extend through part of its wall thickness leaving the inner wall region intact.

5. Apparatus according to claim 1, wherein the tyre has wall thickness between 5 and 20 mm.

6. Apparatus according to claim 1, wherein the tyre is moulded around the roller.

7. Apparatus according to claim 1, wherein the tyre is formed by winding foils around the roller.

8. Apparatus according to claim 1, wherein the tyre is formed on the roller by layerwise polymerisation or vulcanising.

9. Apparatus according to claim 1, wherein the tyre is fibre-reinforced.

10. Apparatus according to claim 1, wherein the outer edges of the outermost rings at the roller ends are also cut away.

11. Apparatus according to claim 3, wherein the O-rings are of hollow tubular form.

* * * * *